United States Patent
Lange et al.

(10) Patent No.: US 11,271,495 B2
(45) Date of Patent: Mar. 8, 2022

(54) INTERMEDIATE CIRCUIT COUPLING IN DRIVE ASSEMBLIES

(71) Applicant: Siemens Aktiengesellschaft, Munich (DE)

(72) Inventors: Robert Lange, Crimmitschau (DE); Holger Strobelt, Stützengrün (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 36 days.

(21) Appl. No.: 16/647,365

(22) PCT Filed: Aug. 28, 2018

(86) PCT No.: PCT/EP2018/073071
§ 371 (c)(1),
(2) Date: Mar. 13, 2020

(87) PCT Pub. No.: WO2019/052804
PCT Pub. Date: Mar. 21, 2019

(65) Prior Publication Data
US 2021/0159811 A1 May 27, 2021

(30) Foreign Application Priority Data

Sep. 14, 2017 (EP) ..................... 17191088

(51) Int. Cl.
*H02M 7/797* (2006.01)
*H02M 7/08* (2006.01)
(Continued)

(52) U.S. Cl.
CPC ............. *H02M 7/797* (2013.01); *H02M 7/08* (2013.01); *H02M 1/007* (2021.05); *H02M 1/32* (2013.01)

(58) Field of Classification Search
CPC ........ H02M 7/797; H02M 7/08; H02M 1/007; H02M 1/32; H02M 1/008; H02M 5/458
(Continued)

(56) References Cited

U.S. PATENT DOCUMENTS 4,061,948 A * 12/1977 Lamparter .............. H02M 5/45
318/87
4,884,182 A * 11/1989 Ando .................. H02M 5/4585
363/37
(Continued)

FOREIGN PATENT DOCUMENTS

DE     19957132 C1    6/2001
EP      0682402 A1   11/1995
JP     2005176475 A    6/2005

OTHER PUBLICATIONS

Attached STIC search report from EIC 2800 searcher Steve Chung, Chickasaw on Apr. 29, 2021 for claim 1. (Year: 2021).*
(Continued)

*Primary Examiner* — Shawki S Ismail
*Assistant Examiner* — Htet Z Kyaw
(74) *Attorney, Agent, or Firm* — Henry M. Feiereisen LLC (57) ABSTRACT

A power converter arrangement includes a first converter and a second converter which include each an intermediate voltage circuit and a load-side converter. The intermediate voltage circuit of the first converter is connected electrically to the intermediate voltage circuit of the second converter by a connecting line. The connecting line is connected to a node point either with three partial connecting lines when the load-side power converters include two half-bridges, or with four partial connecting lines when the load-side power converters includes three half-bridges. Each of the partial
(Continued)

connecting lines has at least one semiconductor component for generating a voltage drop.

9 Claims, 8 Drawing Sheets

(51) Int. Cl.
*H02M 1/00* (2006.01)
*H02M 1/32* (2007.01)

(58) Field of Classification Search
USPC .......................................................... 365/35
See application file for complete search history.

(56) References Cited

U.S. PATENT DOCUMENTS

| | | | | |
|---|---|---|---|---|
| 6,320,775 B1 * | 11/2001 | Ito | ........................ | H02M 5/458 |
| | | | | 363/132 |
| 7,035,123 B2 * | 4/2006 | Schreiber | .............. | H02M 5/458 |
| | | | | 363/37 |
| 7,394,627 B2 * | 7/2008 | Bruckmann | .......... | H02M 5/458 |
| | | | | 361/18 |
| 8,315,071 B2 * | 11/2012 | Ganev | ..................... | H02M 1/12 |
| | | | | 363/5 |
| 8,605,461 B2 * | 12/2013 | Hibino | ................... | H02P 27/08 |
| | | | | 363/17 |
| 9,007,790 B2 * | 4/2015 | Dillig | ................... | H02H 7/1216 |
| | | | | 363/51 |
| 10,033,187 B2 * | 7/2018 | Kasai | ........................ | H02J 3/40 |
| 10,574,172 B2 * | 2/2020 | Wada | ................... | B62D 5/0484 |
| 10,804,835 B2 * | 10/2020 | Fukuda | ..................... | H02M 1/32 |
| 2002/0015320 A1 * | 2/2002 | Mochikawa | ........... | H02M 7/08 |
| | | | | 363/125 |
| 2004/0105199 A1 * | 6/2004 | Huber | ................ | H02M 7/5387 |
| | | | | 361/18 |
| 2005/0018459 A1 * | 1/2005 | Miettinen | ............... | H02M 7/17 |
| | | | | 363/136 |
| 2005/0275386 A1 * | 12/2005 | Jepsen | ................... | H02J 3/387 |
| | | | | 322/9 |
| 2013/0271056 A1 * | 10/2013 | Bunte | .................... | H02P 27/06 |
| | | | | 318/503 |
| 2014/0300298 A1 * | 10/2014 | Liu | .......................... | H02P 3/22 |
| | | | | 318/380 |
| 2015/0270797 A1 * | 9/2015 | Roesner | .................... | H02P 6/12 |
| | | | | 318/400.04 |

OTHER PUBLICATIONS

PCT International Search Report and Written Opinion of International Searching Authority dated Dec. 4, 2018 corresponding to PCT International Application No. PCT/EP2018/073071 filed Aug. 28, 201868.

* cited by examiner

INTERMEDIATE CIRCUIT COUPLING IN DRIVE ASSEMBLIES

CROSS-REFERENCES TO RELATED APPLICATIONS

This application is the U.S. National Stage of International Application No. PCT/EP2018/073071, filed Aug. 28, 2018, which designated the United States and has been published as international Publication No. WO 2019/052804 A1 and which claims the priority of European Patent Application, Serial No. 17191088.8, filed Sep. 14, 2017, pursuant to 35 U.S.C. 119(a)-(d).

BACKGROUND OF THE INVENTION

The invention relates to a power converter arrangement comprising at least one first converter and at least one second converter, whereby the converters each have an intermediate voltage circuit and a load-side power converter, whereby the intermediate voltage circuit of the first converter is electrically connected to the intermediate voltage circuit of the second converter by at least one connecting line.

Electric drives typically comprise an electric machine which is operated via a converter on an alternating voltage network. This converter operation enables a variable speed operation of the electric machine functioning as a motor or a generator. The alternating voltage network can be a single-phase or a three-phase alternating voltage network.

The converter converts a power line frequency of the alternating voltage network, and is therefore designated a frequency converter, into a frequency that is directed to the requirements of the electric machine and its present load.

The converter comprises a supply-side power converter and a load-side power converter. So-called voltage source inverters also have an intermediate voltage circuit with an intermediate circuit capacitor. In addition, a precharging circuit can optionally be realized in the intermediate voltage circuit.

The supply-side power converter is a rectifier which converts a three-phase alternating voltage—typically by means of a B6 bridge circuit with diodes—into a direct voltage. The load-side power converter is configured as an inverter and converts the direct voltage in the intermediate voltage circuit into an alternating voltage needed by the electric machine with a particular amplitude and frequency.

Electric drives are often operated in drive assemblies of two or more electric drives in order, from time to time, during braking of an electric machine, to use electrical energy for accelerating another electric machine. If the electric drive is accelerated, the electric machine operates as a motor. If the electric drive is braked, the electric machine operates as a generator.

The energy exchange takes place in that the converters, or more precisely, the intermediate voltage circuits of the converters are connected to one another by means of an intermediate circuit coupling.

If the electrical energy released during the generator operation is not or not entirely taken up, it can be pulsed, for example by means of a braking chopper to a braking resistor which converts the electrical energy into heat. A further energy-efficient possibility is a feeding-back of the braking energy that is set free into the alternating voltage network by means of a usually very costly feedback-capable converter.

For the intermediate circuit coupling, two essential coupling types are known: A hard coupling and a coupling via a resistance. However, these two coupling types have some disadvantages.

JP2005176475 A discloses a hard coupling which is achieved by means of two switches controlled by a command of a control unit.

The hard coupling is a purely electrical connection of a positive pole of an intermediate voltage circuit of a first converter to a positive pole of an intermediate voltage circuit of a second converter and of a negative pole of the intermediate voltage circuit of the first converter to a negative pole of the intermediate voltage circuit of the second converter. Particularly in the case of devices of two different performance classes, the hard coupling leads, through different charge time constants on precharging or an imbalanced power ratio during operation, to equalizing currents which result in overloading and rapid ageing of the supply-side power converters and of the precharging circuits.

Since the supply-side power converters are often configured as passive input rectifiers, an asymmetric loading can have the effect that a smaller converter which is configured for a smaller load, feeds a larger converter which is configured for a larger load, via the dedicated bridge rectifier. Particularly in the case of severely asymmetric loading, this can lead to an overloading or even to a destruction of the bridge rectifier of the smaller converter.

Differences relating to the threshold voltage, the differential resistance or the bulk resistance of the diodes of the input rectifier are sometimes responsible for the overloading. Since the threshold voltage and the bulk resistance are also temperature-dependent, different temperatures in the drive assembly lead to equalizing currents. Different time constants which result from intermediate circuit capacitances or loadings of the converters and different sized voltage drops between input terminals and the intermediate circuit also contribute to the overloading. By means of a parallel connection of the supply-side power converter arising with the hard coupling, different tolerances of converter components also favor large equalizing currents.

By means of overdimensioning, in particular, of the supply-side power converter, or by a power reduction, an attempt is made to counteract these risks. However, this is associated with an increased cost outlay.

In case of a fault in hard-coupled intermediate circuits, even such high equalizing currents that destroy all the components of the drive assembly or cause dangerous fires by overheating of the conductors are possible.

The intermediate circuit coupling via a resistor is a coupling of the positive pole of one intermediate voltage circuit with the positive pole of the other intermediate voltage circuit via a resistor. The negative poles are also connected in this way. This coupling type leads to a reduced dynamic response level, since the equalizing currents are limited by the resistor. In addition, the high loss power of the resistor has a negative effect on an energy efficiency. If a short-circuit arises in a device, with this coupling type also, large equalizing currents which cause damage to the components and conductors are to be expected.

In the patent specification DE 19957132 C1, a protective device against overpotential at terminals of an item of electrical equipment caused by switching operations of an energy supply is disclosed.

It is therefore an object of the invention to configure the energy exchange in a drive assembly to be energy efficient, safe and economical.

SUMMARY OF THE INVENTION

The achievement of the object takes place by means of a power converter arrangement comprising at least one first converter and at least one second converter, wherein the converters each have an intermediate voltage circuit and a load-side power converter, wherein the intermediate voltage circuit of the first converter is electrically connected to the intermediate voltage circuit of the second converter by at least one connecting line, wherein if the load-side power converter comprises two half-bridges, the connecting line is connected at least at one node point to at least three partial connecting lines or, if the load-side power converter comprises three half-bridges, is connected at least at one node point to at least four partial connecting lines, wherein each partial connecting line has at least one semiconductor component for generating a voltage drop.

A power converter which comprises two half-bridges preferably has at least four power semiconductor units. A power semiconductor unit preferably comprises a semiconductor component with an antiparallel freewheeling diode. For the semiconductor component, an IGBT (insulated-gate bipolar transistor) is particularly suitable. However, other semiconductor components can also be used. Advantageously, these ensure an autonomous power converter operation.

A semiconductor element is advantageous since it is an electronic element which is configured to block when a first voltage is applied and to conduct when a second voltage is applied.

A power converter which comprises three half-bridges preferably has six power semiconductor units.

The intermediate voltage circuits of the converters can each optionally be equipped with a precharging circuit which comprises, as usual, a precharging resistor in parallel with a switch.

The invention offers the advantage that the energy exchange between two converters, in particular, between the intermediate voltage circuits in a drive assembly can be configured to be energy efficient, safe and economical. The connecting lines and partial connecting lines described bring about an intermediate circuit coupling.

If the drive assembly comprises three or more electrical drives, advantageously a number of the connecting lines, node points and partial connecting lines is increased.

Preferably, the semiconductor component for generating the voltage drop is configured as a diode. As economical and relatively uncomplex semiconductor component, diodes are particularly suitable for creating defined current equalizing paths.

However, other current direction-dependent components are also suitable, for example, different types of transistors such as IGBTs, bipolar transistors, MOSFETs or Zener diodes.

The voltage drop is preferably brought about by means of exactly one diode, although a parallel connection of two or more diodes and/or a series connection of two or more diodes is also conceivable.

Diodes are particularly suitable as economical semiconductor components since with a small voltage applied, only a small current flows. A pn-junction of the diode is still highly resistive. With an increasing voltage, the current also increases slightly. Above a particular forward voltage, the so-called threshold voltage, the current rises significantly. The pn-junction opens for a current flow and the diode now has low resistance.

If a voltage difference between a voltage of the intermediate voltage circuit of the first converter and a voltage of the intermediate voltage circuit of the second converter is only slight, no or only a slight equalizing current flows. If the voltage difference exceeds the threshold voltage, as can be expected on braking of an electric machine, the equalizing current can flow.

Depending upon the use and the desired properties, different diodes can be used. For example, with silicon diodes, a threshold voltage of approximately 0.7 V is typical. If the threshold voltage is exceeded, the current rises very rapidly. In the case of germanium diodes which have a threshold voltage of approximately 0.3 V, after reaching the threshold voltage, the current increases significantly more slowly than with silicon diodes.

In this way, a continuous current flow is prevented. In the presence of a high voltage difference, the equalizing current flows. The overloading of one or more supply-side power converters and/or of one or more input rectifiers, however, is reduced to a minimum or even prevented entirely, since a voltage drop takes place at the semiconductor components. Each input rectifier supplies only its own device, so that it will not be overloaded and does not age prematurely.

Preferably, in a load-side power converter which comprises two half-bridges the following partial connecting lines are connected to at least one node point:

A first partial connecting line comprises a first diode, whereby an anode of the first diode is electrically connected to the node point and a cathode of the first diode is electrically connected to a positive pole of the intermediate voltage circuit.

A second partial connecting line comprises a second diode, whereby a cathode of the second diode is electrically connected to the node point and an anode of the second diode is electrically connected to a feed line of a single-phase load.

A third partial connecting line comprises a third diode, whereby a cathode of the third diode is electrically connected to the node point and an anode of the third diode is electrically connected to a return line of a single-phase load.

Preferably, in a load-side power converter which comprises three half-bridges the following partial connecting lines are connected to at least one node point:

A first partial connecting line comprises a first diode, whereby an anode of the first diode is electrically connected to the node point and a cathode of the first diode is electrically connected to a positive pole of the intermediate voltage circuit.

A second partial connecting line comprises a second diode, whereby a cathode of the second diode is electrically connected to the node point and an anode of the second diode is electrically connected to a first phase of a three-phase load.

A third partial connecting line comprises a third diode, whereby a cathode of the third diode is electrically connected to the node point and an anode of the third diode is electrically connected to a second phase of the three-phase load.

A fourth partial connecting line comprises a fourth diode, whereby a cathode of the fourth diode is electrically connected to the node point and an anode of the fourth diode is electrically connected to a third phase of the three-phase load.

Preferably, the connecting line connects a first node point of the first converter to a first node point of the second converter.

The intermediate circuit coupling realized in this way is particularly suitable for a coupling of positive poles of the intermediate voltage circuit.

The arrangement of the anode and cathode of the diode in the first partial connecting line included both in the power converters comprising two half-bridges and also in those comprising three half-bridges prevents a current flow during a precharging phase with the precharging circuit, since the diode is connected in the blocking direction.

The blocking direction of the diodes also enables an impression of electrical energy solely into the intermediate voltage circuits of the converters. This energy arises from the intermediate voltage circuit capacitor of another converter or is released during braking.

Only on a pulse enable of at least one load-side power converter is a feeding back of electrical energy which is released, in particular, on braking of the electric machine connected to the now freed power converter possible.

The pulse enable preferably enables pulses of a pulse width modulation or other control method. Once the pulse enable has been issued, the power semiconductor units of the load-side power converter can output pulses for conversion of the direct voltage into the alternating voltage needed by the load. In the presence of a pulse block, this is not possible.

The feeding back of electrical energy is possible by means of the diodes in the second and third partial connecting line in the case of two power converters comprising two half-bridges or by means of the diodes in the second, third and fourth partial connecting line in the case of power converters comprising three half-bridges. The diodes are arranged such that a current can flow from the single-phase or three-phase load via the respective diode to the node point and from there via the connecting line to the second converter.

This means that during braking of an electric machine which is in generating mode due to the braking, excess electrical energy is stored in an intermediate voltage circuit coupled by the intermediate circuit coupling when an intermediate voltage circuit voltage of the coupled converter is lower than the intermediate voltage circuit voltage of its own converter.

The intermediate circuit coupling together with its feeding back capability is advantageously first effective when all the load-side power converters have a pulse enable. Preferably, the pulse enable is first issued after a completed precharging of the intermediate voltage circuits by means of the precharging circuits, that is, when the load-side power converters and thus also the drive assembly are ready for operation.

In the event of a fault, no enduring short-circuit current is possible since only with the drive assembly operationally ready is the pulse enable and thus the feeding back possible. A current flow via a supply-side power converter is not possible in a drive assembly which is not ready for operation.

This ensures a safe operation since no overheating and no switch-offs resulting therefrom or even fires are to be feared. In addition, no overloading of one or more bridge rectifiers arises.

Thus a design of the bridge rectifier according exactly with the requirements is sufficient, which saves costs. The diodes in the partial connecting lines are also only designed for the needs of the respective electrical drive, since no equalizing currents can flow via the bridge rectifiers. This is firstly more economical and also facilitates a coupling of devices of different performance classes.

Due to the still hard coupling, a high dynamic response level is also ensured.

Despite an increased component expenditure, costs that arise, for example, in the overdimensioning of the input rectifier can be reduced. In addition, a fire risk which arises from the overheating of conductors and components in the event of a fault, is significantly reduced.

Preferably, in a load-side power converter which comprises two half-bridges, the following partial connecting lines are connected to a second node point:

A fourth partial connecting line comprises a fourth diode, whereby a cathode of the fourth diode is electrically connected to the second node point and an anode of the fourth diode is electrically connected to a negative pole of the intermediate voltage circuit.

A fifth partial connecting line comprises a fifth diode, whereby an anode of the fifth diode is electrically connected to the second node point and a cathode of the fifth diode is electrically connected to the feed line of the single-phase load.

A sixth partial connecting line comprises a sixth diode, whereby an anode of the sixth diode is electrically connected to the second node point and a cathode of the sixth diode is electrically connected to the return line of the single-phase load.

Preferably, in the load-side power converter which comprises three half-bridges, the following partial connecting lines are connected to a second node point:

A fourth partial connecting line comprises a fourth diode, whereby a cathode of the fourth diode is electrically connected to the second node point and an anode of the fourth diode is electrically connected to a negative pole of the intermediate voltage circuit.

A fifth partial connecting line comprises a fifth diode, whereby an anode of the fifth diode is electrically connected to the second node point and a cathode of the fifth diode is electrically connected to the first phase of the three-phase load.

A sixth partial connecting line comprises a sixth diode, whereby an anode of the sixth diode is electrically connected to the second node point and a cathode of the sixth diode is electrically connected to the second phase of the three-phase load.

A seventh partial connecting line comprises a seventh diode, whereby an anode of the seventh diode is electrically connected to the second node point and a cathode of the seventh diode is electrically connected to the third phase of the three-phase load.

The intermediate circuit coupling realized by means of this power converter arrangement is particularly suitable for a coupling of negative poles of the intermediate voltage circuits.

Compared with the power converter arrangement described above in which at least one diode is arranged in each of the first, second and third partial connecting lines in the case of power converters comprising two half-bridges and/or in which at least one diode is arranged in each of the first, second, third and fourth partial connecting lines in the case of power converters comprising three half-bridges, the power converter arrangement described above has the following advantage: A current ripple is reduced in that additionally at least one diode is arranged in each of the fourth, fifth and sixth partial connecting lines in the case of power converters comprising two half-bridges and/or in which at least one diode is arranged in each of the fifth, sixth, seventh and eighth partial connecting lines in the case of power converters comprising three half-bridges. In addition, this power converter arrangement brings about a thermal load relief to the respective load-side power converter, since a feedback current when feeding another converter does not flow via the internal diodes of the load-side power converter configured as an inverter. The additional diodes become advantageous with regard to their EMC behavior or their current chopping behavior.

Preferably, at least one feed line to the load has at least one resistor. This relates both to the single-phase and also the three-phase load. Preferably, each feed line to the load has exactly one resistor for current measurement.

Advantageously, the resistor which is also designated a shunt is of low resistance in its function as a measuring shunt.

Advantageously, the shunt or shunts is or are arranged on at least one feed line to the load as follows:

In the case of power converters comprising two half-bridges, a first shunt is arranged in parallel with the second diode and in parallel with a power semiconductor unit of a first half-bridge on the feed line. The shunt is also arranged in parallel with the first diode.

In the case of power converters comprising three half-bridges, a first shunt is arranged in parallel with the second diode and in parallel with a power semiconductor unit of a first half-bridge, a second shunt is arranged in parallel with the third diode and in parallel with a power semiconductor unit of a second half-bridge and a third shunt is arranged in parallel with the fourth diode and in parallel with a power semiconductor unit of a third half-bridge. The shunts are also in parallel with the first diode.

The shunts described offer the advantage that on occurrence of a short-circuit in the converter, in one of the connecting lines or in partial connecting lines of the intermediate circuit coupling, it can be detected in other coupled converters by means of the shunt described. By means of a pulse block which is triggered, for example, by a higher-order control unit, an immediate stopping of the electric machine and of the converter operation can take place. No further damage need then be feared.

In this way, a short-circuit can be detected by means of a current measurement in the phases of the load. In addition, a short-circuit detection by means of a UCE monitoring of the power semiconductor units is also possible. The current measurement also takes place herein by means of measuring shunts. If a monitored UCE voltage of an IGBT exceeds a threshold value during a current flow, in particular during a shaft-circuit current, a shut-down of the IGBT takes place. The supply-side power converter can be shut down safely, in particular, by means of the pulse block.

The advantages of the invention can be described, in summary, as follows. During the precharging phase, no equalizing currents flow. In the case of a short-circuit also, no equalizing currents can occur, since a current flow to other intermediate voltage circuits via an input rectifier is not possible. if a short-circuit occurs in a parallel-connected converter, this can be detected by means of the shunts for current measurement or via the UCE monitoring, which enables a rapid intervention and a safe shut-down. In addition, the drive assembly is robust in relation to faults.

Furthermore, a coupling of devices of different performance classes is unproblematic since no equalizing currents can flow via the input rectifier. This sometimes leads to a cost saving since components of the input rectifier no longer have to be overdimensioned and need only be designed for a power level of its own device. Due to the still hard coupling, a high dynamic response level is also ensured.

BRIEF DESCRIPTION OF THE DRAWING

The invention will now be described and explained in greater detail making reference to the exemplary embodiments illustrated in the drawings. In the drawings.

DETAILED DESCRIPTION OF PREFERRED EMBODIMENTS

Figure 1:
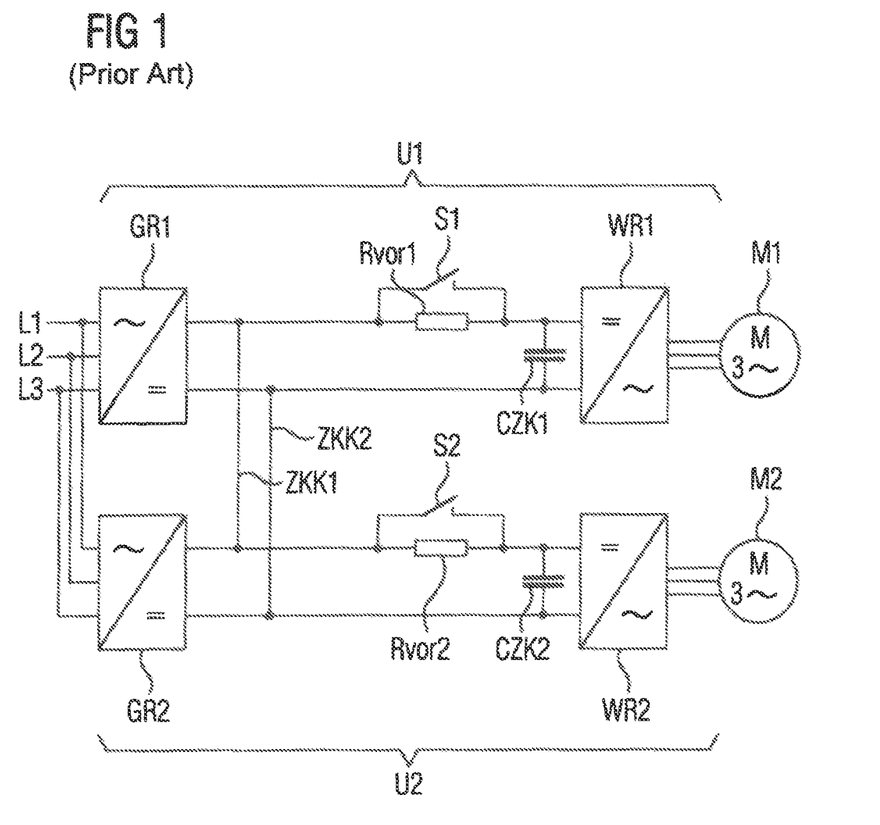
FIG. 1 is an embodiment of a power converter arrangement for intermediate circuit coupling to a three-phase load according to the prior art.

FIG. 1 shows an embodiment of a power converter arrangement for intermediate circuit coupling to a three-phase load according to the prior art. A first converter U1 and a second converter U2 are connected to an electrical energy supply network with the three phases L1, L2 and L3.

The converter U1 comprises, as a supply-side power converter, an input rectifier GR1 and as a load-side power converter, an inverter WR1.

The inverter WR1 provides three phases which serve for connection of a three-phase load, in particular an electric machine M1.

An intermediate voltage circuit between the two power converters has a capacitor, also referred to as an intermediate voltage circuit capacitor, CZK1 and an optional precharging circuit which comprises a precharging resistor Rvor1 and a switch S1. However, the converter U2 comprises, as a supply-side power converter, an input rectifier GR2 and as a load-side power converter, an inverter WR2. The inverter WR2 provides three phases which serve for connection of a three-phase load, in particular an electric machine M2.

The precharging circuit prevents overloading of the bridge rectifier on switching in the energy supply network and is therefore often used.

An intermediate voltage circuit between the two power converters has an intermediate voltage circuit capacitor, CZK2 and an optional precharging circuit which comprises a precharging resistor Rvor2 and a switch S2. The two intermediate voltage circuits are hard coupled via two connecting lines.

In the figure, the connecting line ZKK1 connects a positive pole of the intermediate voltage circuit of the converter U1 to a positive pole of the intermediate voltage circuit of the converter U2. In the figure, the connecting line ZKK2 connects a negative pole of the intermediate voltage circuit of the converter U1 to a negative pole of the intermediate voltage circuit of the converter U2.

Figures 2, 2A:
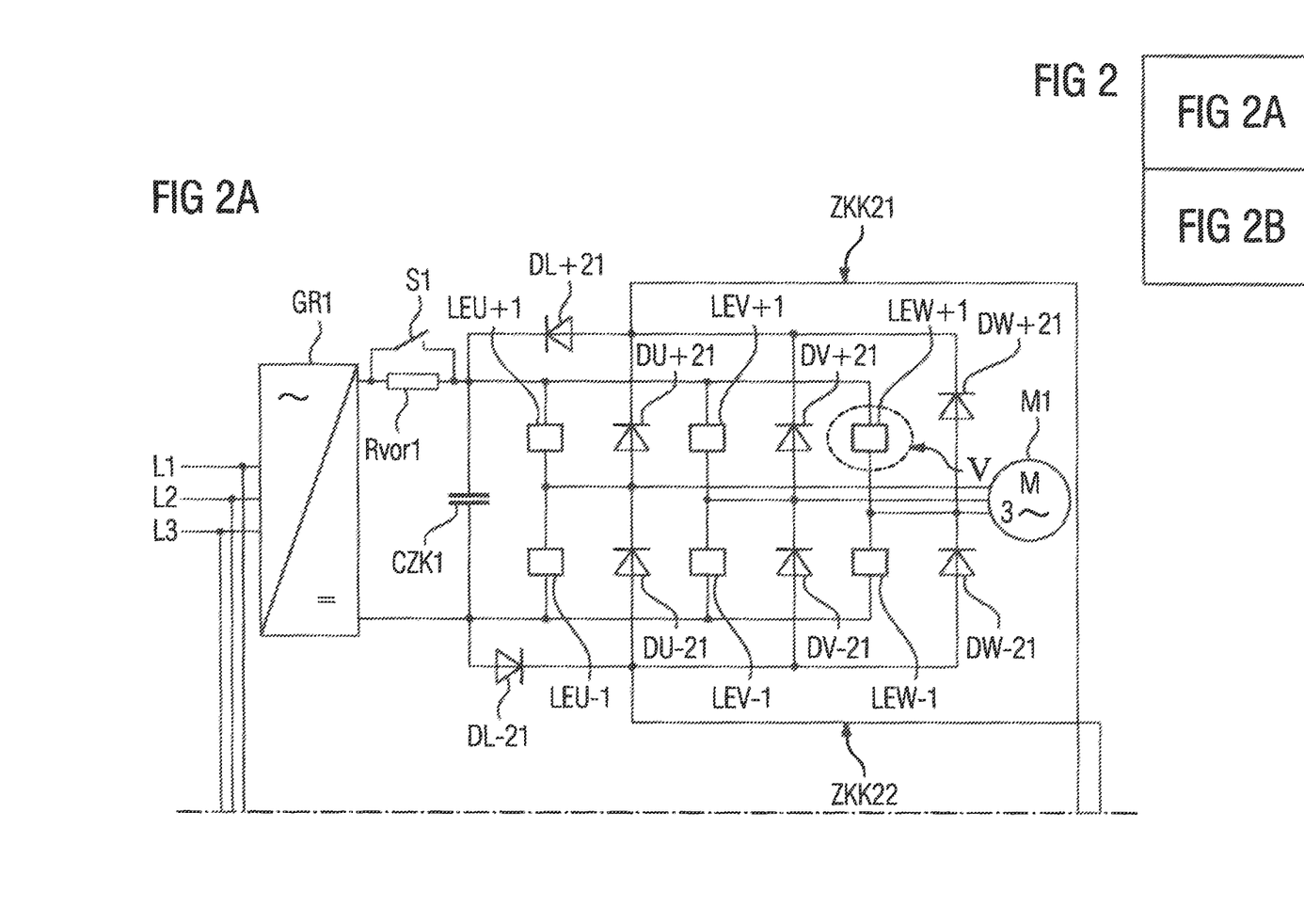
FIG. 2 is an embodiment of an optimized power converter arrangement for intermediate circuit coupling to a three-phase load.
Figure 2B:
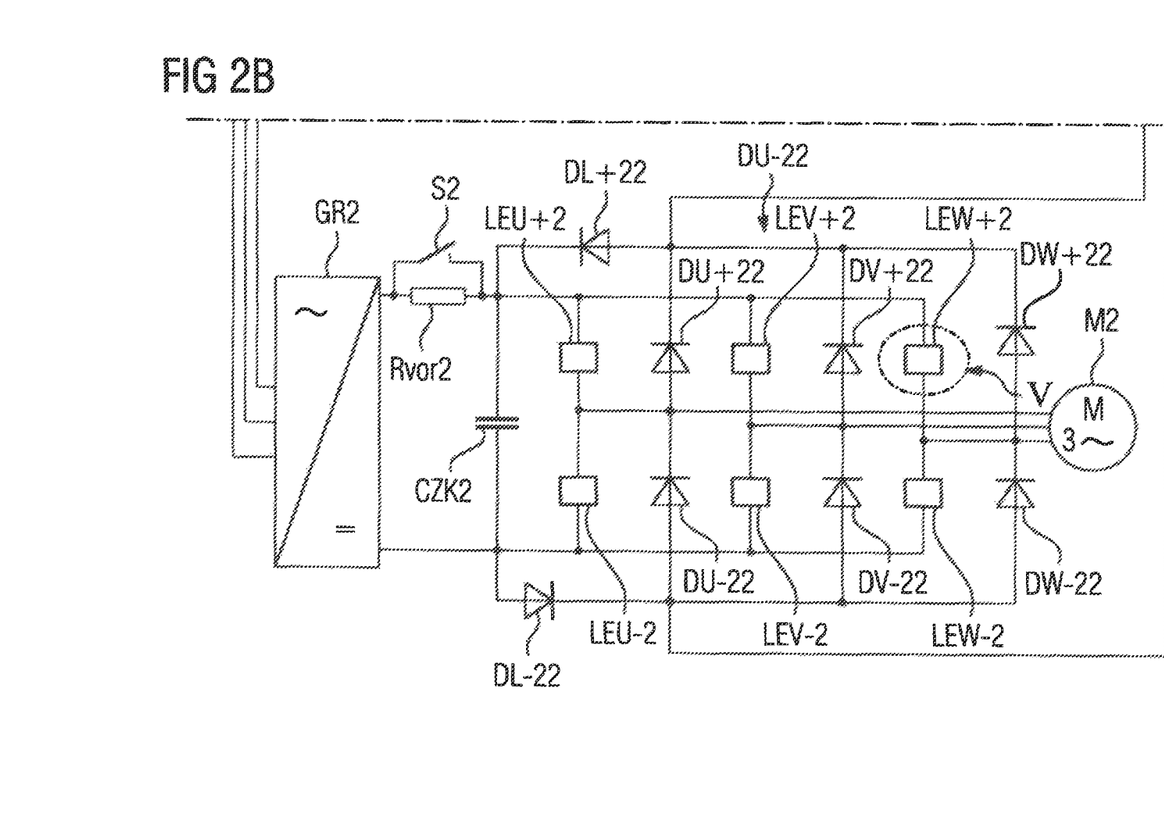

FIG. 2 shows an embodiment of an optimized power converter arrangement for intermediate circuit coupling to a three-phase load. FIG. 2 incorporates FIGS. 2A and 2B.

A first converter and a second converter are connected to an electrical energy supply network with the three phases L1, L2 and L3.

The first converter comprises, as previously described in relation to FIG. 1, an input rectifier GR1 as the supply-side power converter, an intermediate voltage circuit and a load-side power converter. The intermediate voltage circuit comprises an optional precharging circuit which comprises the precharging resistor Rvor1 and the switch S1, as well as the intermediate voltage circuit capacitor CZK1.

The precharging circuit prevents overloading of the bridge rectifier on switching in the energy supply network and is therefore often used.

The load-side power converter provides three phases which serve for the connection of the three-phase load, in particular, an electric machine M1.

The load-side power converter has three half-bridges. Each half-bridge has two power semiconductor units. The first half-bridge has the power semiconductor units LEU+1 and LEU−1, the second half-bridge has the power semiconductor units LEV+1 and LEV−1 and the third half-bridge has the power semiconductor units LEW+1 and LE−1. The power semiconductor units are described in greater detail below in relation to FIG. 5.

The second converter comprises, as previously described in relation to FIG. 1, an input rectifier GR2 as the supply-side power converter, an intermediate voltage circuit and a load-side power converter. The intermediate voltage circuit comprises an optional precharging circuit which has the precharging resistor Rvor2 and the switch S2, as well as the intermediate voltage circuit capacitor CZK2. The load-side power converter provides three phases which serve for the connection of the three-phase load, in particular, an electric machine M2.

The load-side power converter has three half-bridges. Each half-bridge has two power semiconductor units. The first half-bridge has the power semiconductor units LEU+2 and LEU−2, the second half-bridge has the power semiconductor units LEV+2 and LEV−2 and the third half-bridge has the power semiconductor units LEW+2 and LEW−2. The power semiconductor units are described in greater detail below in relation to FIG. 5.

The positive poles of the two converters are coupled by means of a connecting line ZKK21 and the negative poles of the two converters are coupled by means of a connecting line ZKK22.

The diodes DL+21 and DL−21 are each part of a partial connecting line and prevent a current flow during a precharging phase by means of the precharging circuit, since they are connected in the blocking direction. This also enables an impression of electrical energy solely into the intermediate voltage circuits of the converters.

Only once the pulse enable has been issued, that is, after completion of the precharging, for the power semiconductor units LEU+1, LEV+1, LEW+1, LEU−1, LEV−1, LEW−1, LEU+2, LEV+2, LEW+2, LEU−2, LEV−2 and LEW−2, is electrical energy that is released, for example, during braking of the electric machines M1 and/or M2, fed back.

The feeding back of electrical energy is possible by means of the diodes DU+21, DV+21, DW+21, DU−21, DV−21, DW−21, DU+22, DV+22, DW+22, DU−22, DV−22 and DW−22.

The diodes DU+21, DV+21 and DW+21 are part of so-called partial connecting lines and are arranged such that a current can flow from the three-phase load M1 via the respective diode to a first node point of the first converter and from there via the respective connecting line ZKK21 to a first node point of the second converter.

The diodes DU+22, DV+22 and DW+22 are part of partial connecting lines and are arranged such that a current can flow from the three-phase load M2 via the respective diode to the first node point of the second converter and from there via the respective connecting line ZKK21 to the first node point of the first converter.

The current can flow from the first node point of the first converter via the diode DL+21 into the intermediate voltage circuit of the first converter. The current can flow from the first node point of the second power converter via the diode DL+21 into the intermediate voltage circuit of the first converter.

Current can flow from the intermediate voltage circuit of the first converter via the diode DL−21 and the second node point of the first converter via the connecting line ZKK22 to a second node point of the second converter. From there, the three-phase load M2 can be supplied via the diodes DU−22, DV−22 and DW−22.

Current can flow from the intermediate voltage circuit of the second converter via the diode DL−22 and a second node point of the second converter via the connecting line ZKK22 to the second node point of the first converter. From there, the three-phase load M1 can be supplied via the diodes DU−21, DV−21 and DW−21.

An enduring short-circuit current in the event of a fault is not possible in that only on pulse enable does feeding back take place via the diodes DU+21, DV+21, DW+21, DU−21, DV−21, DW−21, DU+22, DV+22, DW+22, DU−22, DV−22 and DW−22. If the drive assembly is not operational in the event of a fault, a pulse block is present. A current flow via the input rectifier GR1 or GR2 and their components is not possible.

Figures 3, 3A:
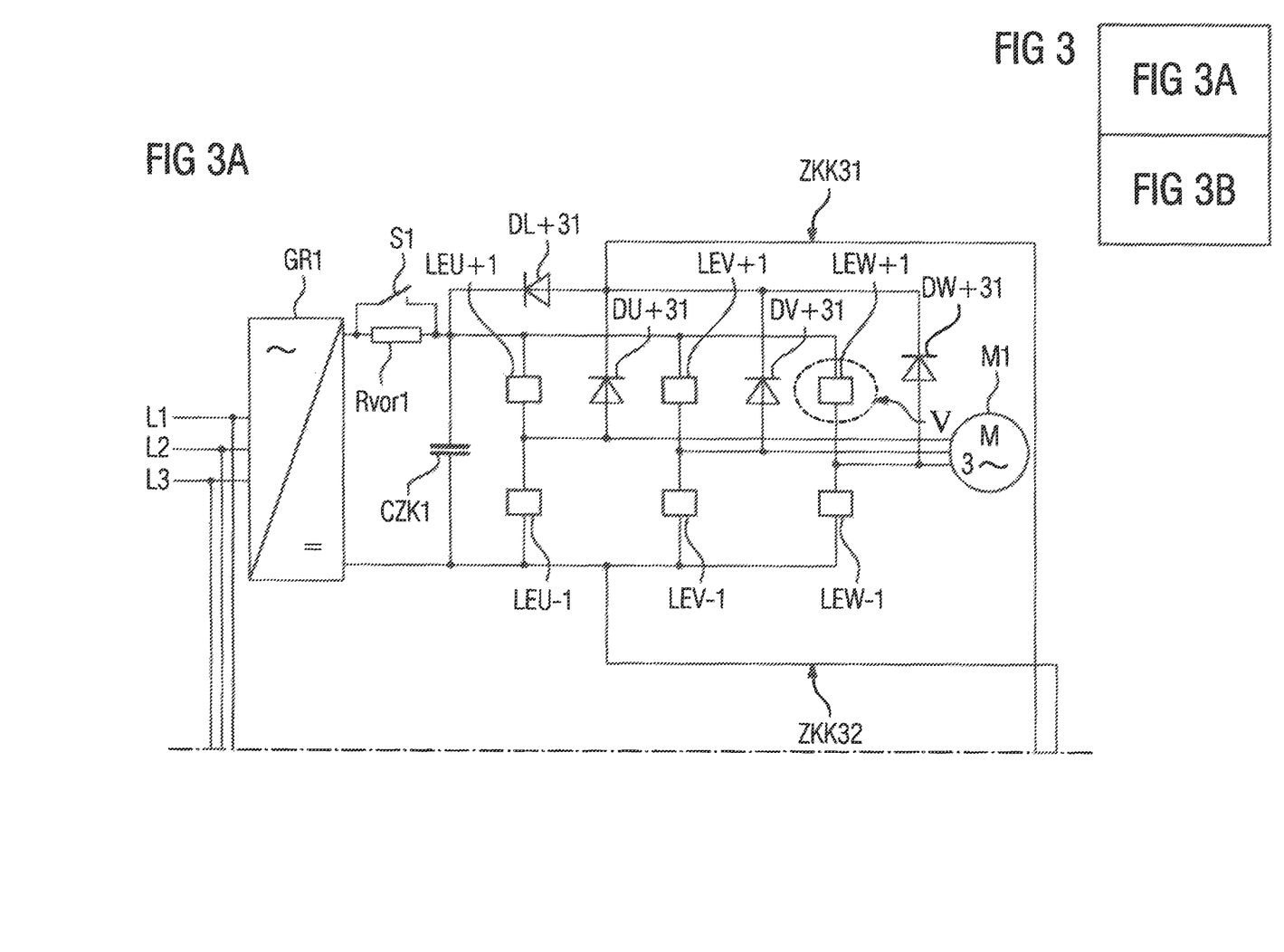
FIG. 3 is an embodiment of an optimized power converter arrangement for intermediate circuit coupling to a three-phase load, with low component expenditure.
Figure 3B:
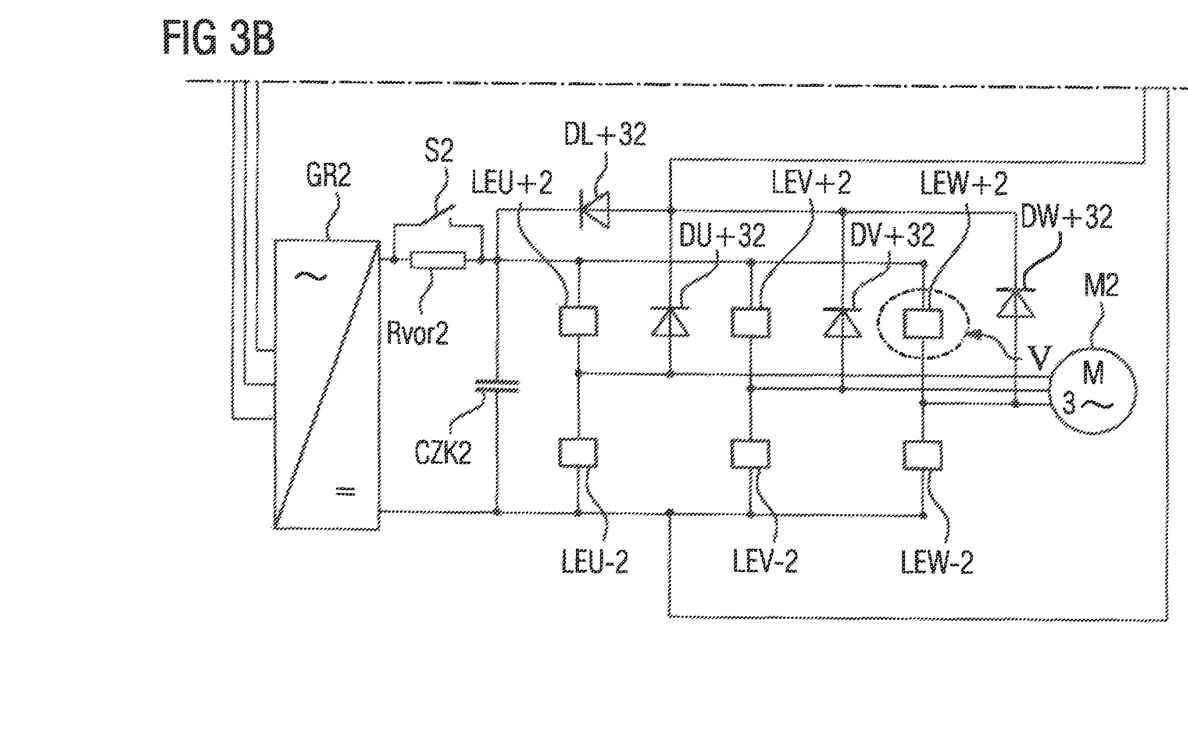

FIG. 3 shows an embodiment of an optimized power converter arrangement for intermediate circuit coupling to a three-phase load, with low component expenditure. FIG. 3 incorporates FIGS. 3A and 3B.

A first converter and a second converter are connected to an electrical energy supply network with the three phases L1, L2 and L3.

The first converter comprises, as previously described in relation to FIG. 1 and FIG. 2, an input rectifier GR1 as the supply-side power converter, an intermediate voltage circuit and a load-side power converter. The intermediate voltage circuit comprises an optional precharging circuit which has the precharging resistor Rvor1 and the switch S1, as well as the intermediate voltage circuit capacitor CZK1.

The precharging circuit prevents overloading of the bridge rectifier on switching in the energy supply network and is therefore often used.

The load-side power converter provides three phases which serve for the connection of the three-phase load, in particular, an electric machine M1.

The load-side power converter has three half-bridges. Each half-bridge has two power semiconductor units. The first half-bridge has the power semiconductor units LEU+1 and LEU−1, the second half-bridge has the power semiconductor units LEV+1 and LEV−1 and the third half-bridge has the power semiconductor units LEW+1 and LE−1. The power semiconductor units are described in greater detail below in relation to FIG. 5.

As described in relation to FIGS. 1 and 2, the second converter comprises an input rectifier GR2 as the supply-side power converter, an intermediate voltage circuit and a load-side power converter. The intermediate voltage circuit comprises an optional precharging circuit which has the precharging resistor Rvor2 and the switch S2, as well as the intermediate voltage circuit capacitor CZK2. The load-side power converter provides three phases which serve for the connection of the three-phase load, in particular, an electric machine M2.

The load-side power converter has three half-bridges. Each half-bridge has two power semiconductor units. The first half-bridge has the power semiconductor units LEU+2 and LEU−2, the second half-bridge has the power semiconductor units LEV+2 and LEV−2 and the third half-bridge has the power semiconductor units LEW+2 and LEW−2. The power semiconductor units are described in greater detail below in relation to FIG. 5.

The positive poles of the two converters are coupled by means of a connecting line ZKK31 and the negative poles of the two converters are coupled by means of a connecting line ZKK32.

The diode DL+31 is part of a partial connecting line and prevents a current flow during a precharging phase by means of the precharging circuit, since it is connected in the blocking direction. This also enables an impression of electrical energy solely into the intermediate voltage circuits of the converters.

Only when a pulse enable is issued is electrical energy fed back.

The feeding back of electrical energy from the respective electric machine is possible by means of the diodes DU+31, DV+31, DW+31 or DU+32, DV+32 and DW+32. The diodes are part of so-called partial connecting lines and are arranged such that a current can flow from the three-phase load M1 or M2 via the respective diode to the node point and from there via the respective connecting line ZKK31 or ZKK32 to the second converter.

An enduring short-circuit current is not possible in that only on pulse enable does the feeding back take place via the diodes DU+31, DV+31, DW+31, DU+32, DV+32, DW+32. If the drive assembly is not operational in the event of a fault, a pulse block is present. A current flow via the input rectifier GR1 or GR2 and their components is not possible.

Figures 4, 4A:
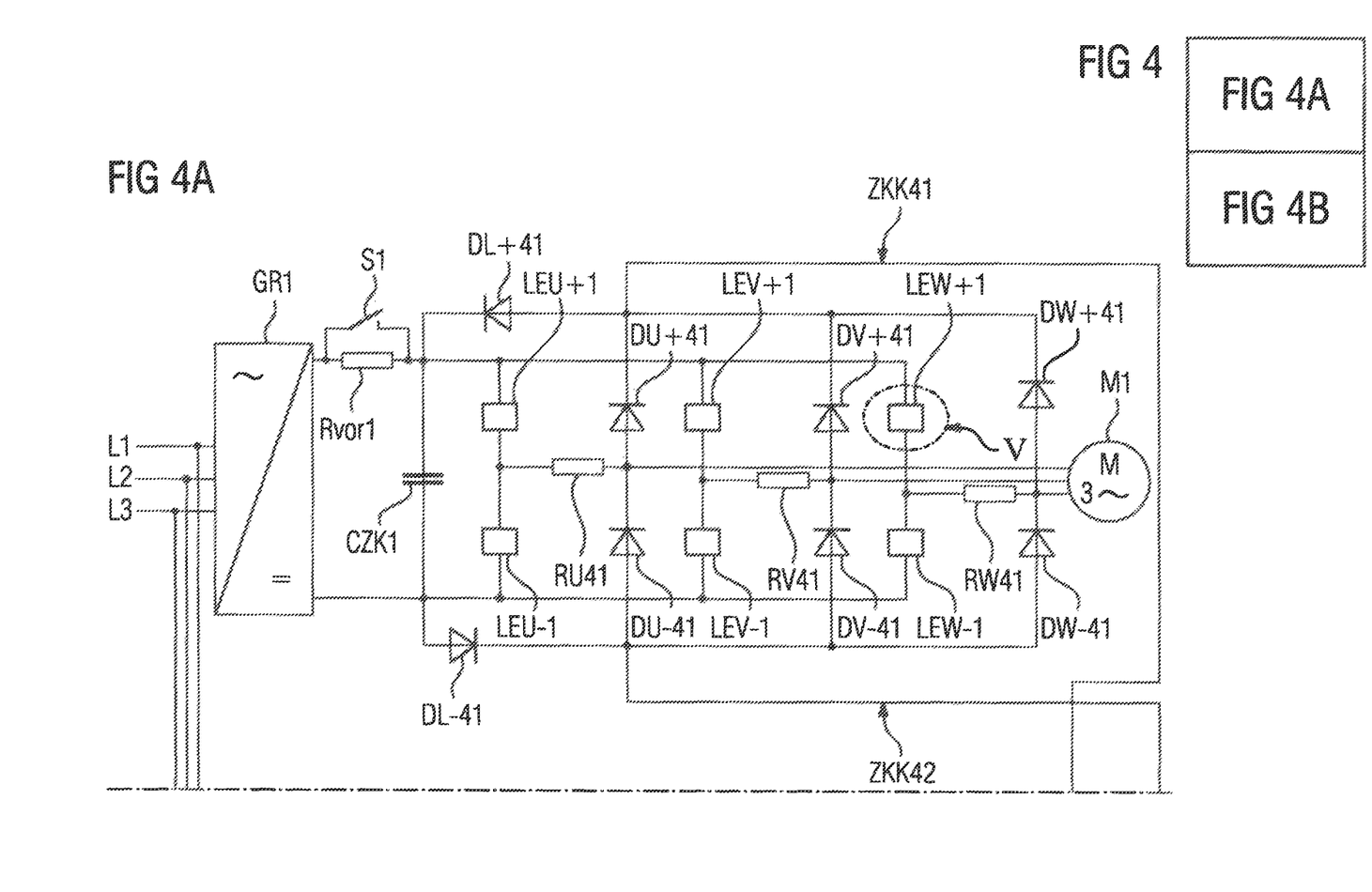
FIG. 4 is an embodiment of an optimized power converter arrangement for intermediate circuit coupling to a three-phase load, with shunts for current measurement.
Figure 4B:
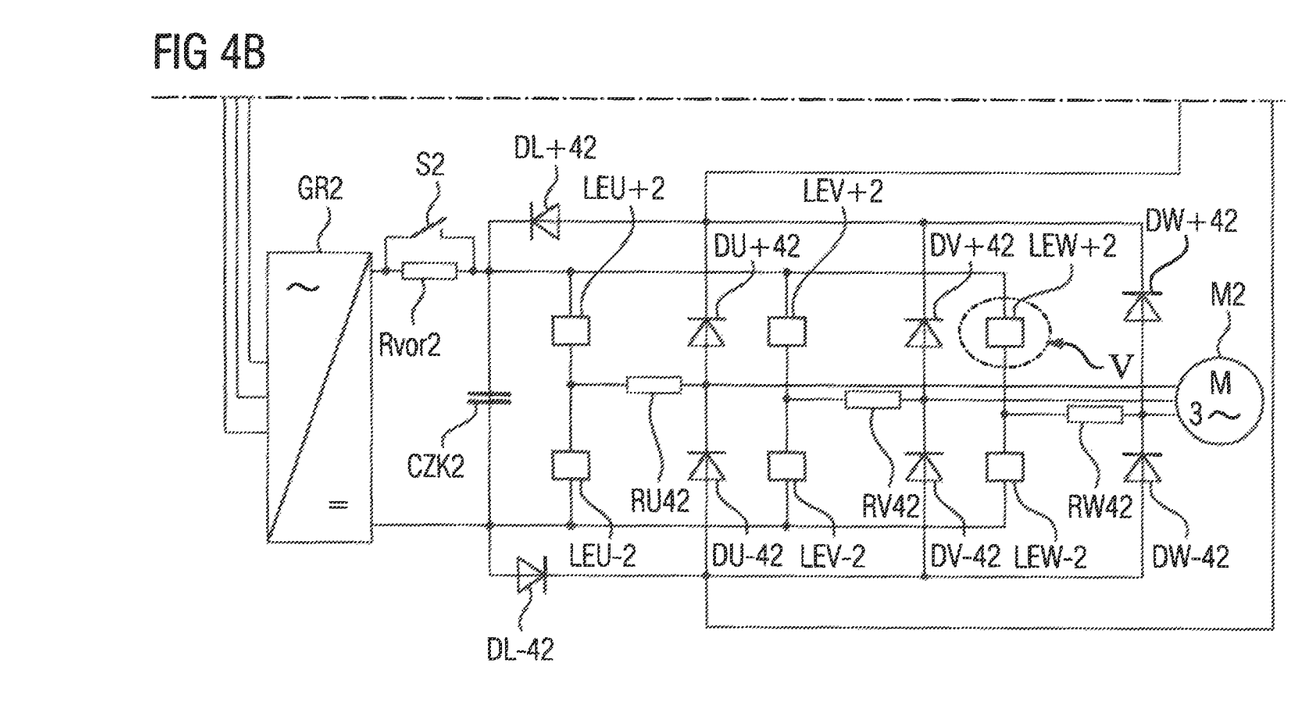

FIG. 4 shows an embodiment of an optimized power converter arrangement for intermediate circuit coupling to a three-phase load, with shunts for current measurement. FIG. 4 incorporates FIGS. 4A and 4B.

A first converter and a second converter are connected to an electrical energy supply network with the three phases L1, L2 and L3.

The first converter comprises, as previously described in relation to the previous figures, an input rectifier GR1, an intermediate voltage circuit and a load-side power converter with the power semiconductor units LEU+1, LEV+1, LEW+1, LEU−1, LEV−1, LEW−1. The intermediate voltage circuit comprises an optional precharging circuit which has the precharging resistor Rvor1 and the switch S1, as well as the intermediate voltage circuit capacitor CZK1.

The precharging circuit prevents overloading of the bridge rectifier on switching in the energy supply network.

The load-side power converter provides three phases which serve for the connection of the three-phase load, in particular, an electric machine M1.

The load-side power converter has three half-bridges. Each half-bridge has two power semiconductor units. The first half-bridge has the power semiconductor units LEU+1 and LEU−1, the second half-bridge has the power semiconductor units LEV+1 and LEV−1 and the third half-bridge has the power semiconductor units LEW+1 and LEW−1. The power semiconductor units are described in greater detail below in relation to FIG. 5.

The second converter comprises an input rectifier GR2, an intermediate voltage circuit and a load-side power converter with the power semiconductor units LEU+2, LEV+2, LEW+2, LEU−2, LEV−2, LE−2. The intermediate voltage circuit comprises an optional precharging circuit which has the precharging resistor Rvor2 and the switch S2, as well as the intermediate voltage circuit capacitor CZK2. The load-side power converter provides three phases which serve for the connection of the three-phase load, in particular, an electric machine M2.

The load-side power converter has three half-bridges. Each half-bridge has two power semiconductor units. The first half-bridge has the power semiconductor units LEU+2 and LEU−2, the second half-bridge has the power semiconductor units LEV+2 and LEV−2 and the third half-bridge has the power semiconductor units LEW+2 and LEW−2. The power semiconductor units are described in greater detail below in relation to FIG. 5.

The positive poles of the two converters are coupled by means of a connecting line ZKK41 and the negative poles of the two converters are coupled by means of a connecting line ZKK42.

The diodes DL+41 and DL−41 are each part of a partial connecting line and prevent a current flow during a precharging phase by means of the precharging circuit, since they are connected in the blocking direction. This also enables an impression of electrical energy solely into the intermediate voltage circuits of the converters.

The feeding back of electrical energy as previously described regarding the very similar embodiment in FIG. 2 is possible by means of the diodes DU+41, DV+41, DW+41, DU−41, DV−41, DW−41, DU+42, DV+42, DW+42, DU−42, DV−42 and DW−42. The diodes are part of so-called partial connecting lines and are arranged such that a current can flow from the three-phase load M1 or M2 via the respective diode to the node point and from there via the respective connecting line ZKK41 or ZKK42 to the second converter.

In the figure, each feed line has exactly one low-value resistor RU41, RV41, RW41, RU42, RV42 and RW42—also called shunts—for current measurement.

The shunts RU41, RV41, RW41, RU42, RV42 and RW42 as described offer the following advantage: On occurrence of a short-circuit in the converter, in one of the connecting ones or partial connecting lines of the intermediate circuit coupling, this can be detected in other coupled converters by means of the shunts described. By means of a pulse block which is triggered, for example, by a higher-order control unit, an immediate stopping of the electric machine and of the converter operation can take place.

Figure 5:
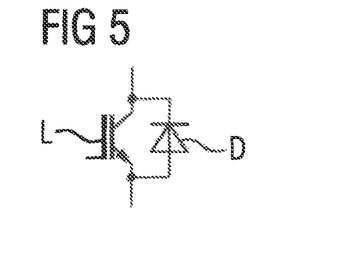
FIG. 5 is an embodiment of a power semiconductor unit.

FIG. 5 shows an embodiment of a power semiconductor unit. The power semiconductor unit in the figure comprises an IGBT with an antiparallel freewheeling diode.

In place of an IGBT, identified in the figure as L, other semiconductor components can also be used, as can, inter alia, different types of transistor. Semiconductor components which ensure an autonomous power converter operation are advantageous. Herein, for example, field effect transistors and bipolar transistors in every construction are included.

The antiparallel freewheeling diode D is obligatory in the use of a frequency converter for a drive, although it possesses a protective function. It protects the semiconductor component against overvoltages that can occur if the semiconductor component no longer connects through.

Figure 6:
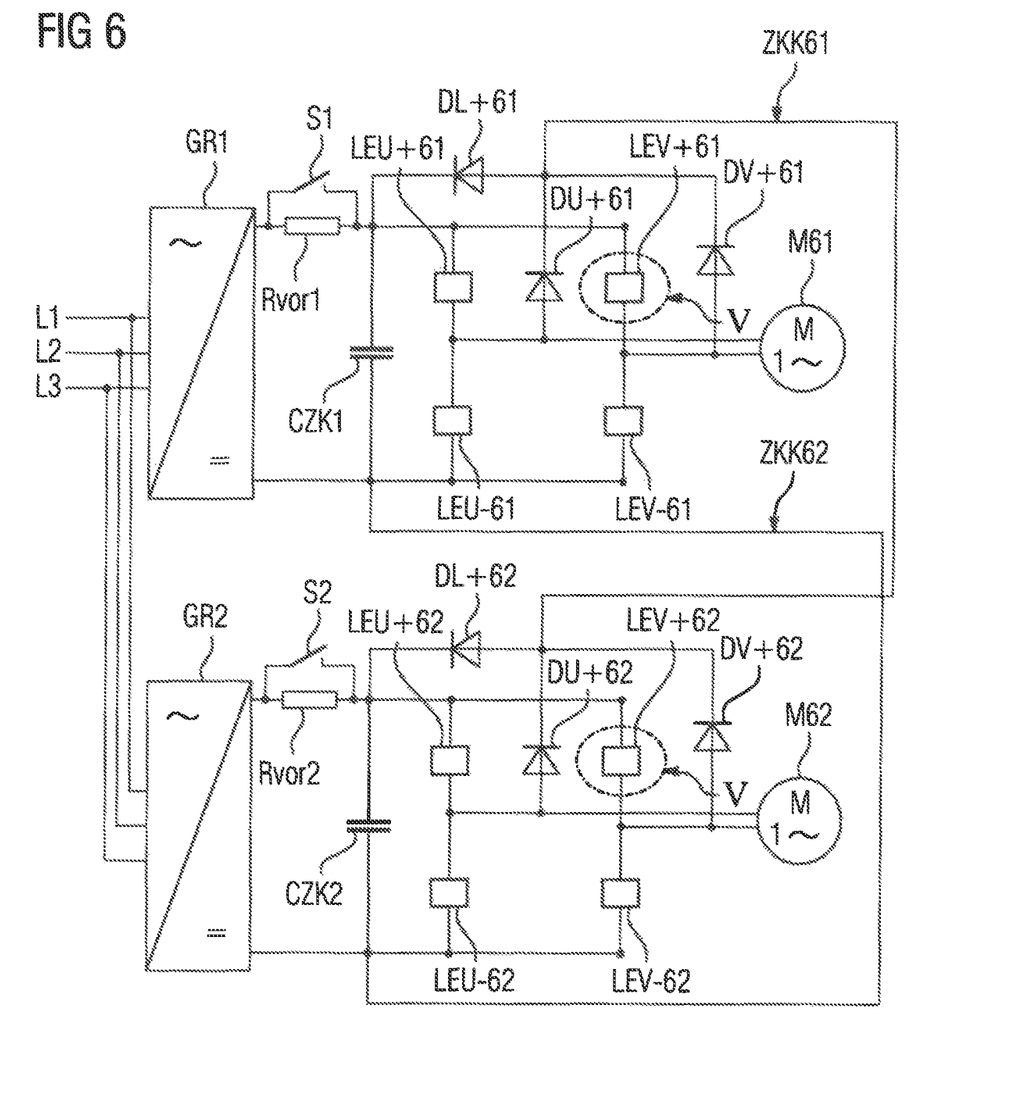
FIG. 6 is an embodiment of an optimized power converter arrangement for intermediate circuit coupling to a single-phase load, with low component expenditure.

FIG. 6 shows an embodiment of an optimized power converter arrangement for intermediate circuit coupling with low component expenditure and a single-phase load.

The embodiment shown in the figure illustrates a solution for a single-phase electric machine and is oriented to FIG. 3. However, another arrangement with further partial connecting lines and diodes—as shown in FIG. 2—for a two-phase electric machine is also possible.

In addition, an inclusion of resistors is also possible—as shown in FIG. 4—for current measurement.

A first converter and a second converter are connected to an electrical energy supply network with the three phases L1, L2 and L3.

The first converter comprises an input rectifier GR1 as the supply-side power converter, an intermediate voltage circuit and a load-side power converter. The intermediate voltage circuit comprises an optional precharging circuit which has the precharging resistor Rvor1 and the switch S1, as well as the intermediate voltage circuit capacitor CZK1.

The precharging circuit prevents overloading of the bridge rectifier on switching in the energy supply network.

The load-side power converter provides two phases which serve for the connection of the two-phase load, in particular, an electric machine M61.

The load-side power converter has two half-bridges. Each half-bridge has two power semiconductor units. The first half-bridge has the power semiconductor units LEU+61 and LEU−61 and the second half-bridge has the power semiconductor units LEV+61 and LEV−61. The power semiconductor units are described in greater detail in relation to FIG. 5.

The second converter comprises an input rectifier GR2 as the supply-side power converter, an intermediate voltage circuit and a load-side power converter. The intermediate voltage circuit comprises an optional precharging circuit which has the precharging resistor Rvor2 and the switch 32, as well as the intermediate voltage circuit capacitor CZK2. The load-side power converter provides two phases which serve for the connection of the two-phase load, in particular, an electric machine M62.

The load-side power converter has two half-bridges. Each half-bridge has two power semiconductor units. The first half-bridge has the power semiconductor units LEU+62 and LEU−62 and the second half-bridge has the power semiconductor units LEV+62 and LEV−62, The power semiconductor units are described in greater detail in relation to FIG. 5.

The positive poles of the two converters are coupled by means of a connecting line ZKK61 and the negative poles of the two converters are coupled by means of a connecting line ZKK62.

The diode DL+61 is part of a partial connecting line and prevents a current flow during a precharging phase by means of the precharging circuit, since it is connected in the blocking direction. This also enables an impression of electrical energy solely into the intermediate voltage circuits of the converters.

Only when a pulse enable is issued is electrical energy fed back.

The feeding back of electrical energy is possible by means of the diodes DU+61, DV+61, DU+62, DV+62. The diodes are part of so-called partial connecting lines and are arranged such that a current can flow from the three-phase load M61 or M62 via the respective diode to the node point and from there via the respective connecting line ZKK61 or ZKK62 to the second converter.

An enduring short-circuit current is not possible in that only on pulse enable does feeding back take place via the diodes DU+61, DV+61, DU+62, DV+62. If the drive assembly is not operational in the event of a fault, a pulse block is present. A current flow via the input rectifier GR1 or GR2 and their components is not possible.

The invention claimed is:

1. A power converter arrangement, comprising:
a first converter including an intermediate voltage circuit and a load-side power converter;
a second converter including an intermediate voltage circuit and a load-side power converter; and
a connecting line electrically connecting the intermediate voltage circuit of the first converter to the intermediate voltage circuit of the second converter, said connecting line being connected in one of two ways, a first way in which the connecting line is connected to a first node point of the load-side power converter of the first converter with at least three partial connecting lines of the load-side power converter of the first converter, when the load-side power converter of the first converter and the load-side power converter of the second converter have each two half-bridges, a second way in which the connecting line is connected to a first node point of the load-side power converter of the first converter with at least four partial connecting lines of the load-side power converter of the first converter, when the load-side power converter of the first converter and the load-side power converter of the second converter have each three half-bridges,
wherein each of the partial connecting line includes a semiconductor component for generating a voltage drop.

2. The power converter arrangement of claim 1, wherein the semiconductor component is configured as a diode.

3. The power converter arrangement of claim 2, wherein, when the load-side power converter of the first converter and the load-side power converter of the second converter have each two half-bridges, the three partial connecting lines are defined by
a first partial connecting line comprising a first diode including an anode electrically connected to the first node point and a cathode electrically connected to a positive pole of the intermediate voltage circuit of the first converter,
a second partial connecting line comprising a second diode including a cathode electrically connected to the first node point and an anode electrically connected to a feed line of a single-phase load, and
a third partial connecting line comprising a third diode having a cathode electrically connected to the first node point and an anode electrically connected to a return line of the single-phase load.

4. The power converter arrangement of claim 3, wherein, when the load-side power converter of the first converter and the load-side power converter of the second converter have each two half-bridges, further comprising three partial connecting lines of the load-side power converter of the first converter connected to a second node point of the load-side power converter of the first converter and defined by
a fourth partial connecting line comprising a fourth diode including an anode electrically connected to the second node point and a cathode electrically connected to a positive pole of the intermediate voltage circuit of the first converter,
a fifth partial connecting line comprising a fifth diode including a cathode electrically connected to the second node point and an anode electrically connected to a feed line of a single-phase load, and
a sixth partial connecting line comprising a sixth diode having a cathode electrically connected to the second node point and an anode electrically connected to a return line of the single-phase load.

5. The power converter arrangement of claim 2, wherein, when the load-side power converter of the first converter and the load-side power converter of the second converter have each three half-bridges, the four partial connecting lines are defined by
- a first partial connecting line comprising a first diode including an anode electrically connected to the first node point and a cathode electrically connected to a positive pole of the intermediate voltage circuit of the first converter,
- a second partial connecting line comprising a second diode including a cathode electrically connected to the first node point and an anode electrically connected to a first phase of a three-phase load,
- a third partial connecting line comprising a third diode including a cathode electrically connected to the first node point and an anode electrically connected to a second phase of the three-phase load, and
- a fourth partial connecting line comprising a fourth diode including a cathode electrically connected to the first node point and an anode electrically connected to a third phase of the three-phase load.

6. The power converter arrangement of claim 5, wherein, when the load-side power converter of the first converter and the load-side power converter of the second converter have each three half-bridges, further comprising four partial connecting lines of the load-side power converter of the first converter connected to a second node point of the load-side power converter of the first converter and defined by
- a fifth partial connecting line comprising a fifth diode including a cathode electrically connected to the second node point and an anode electrically connected to a negative pole of the intermediate voltage circuit of the first converter,
- a sixth partial connecting line comprising a sixth diode including an anode electrically connected to the second node point and a cathode electrically connected to the first phase of the three-phase load,
- a seventh partial connecting line comprising a seventh diode including an anode electrically connected to the second node point and a cathode electrically connected to the second phase of the three-phase load, and
- an eighth partial connecting line comprising an eighth diode including an anode electrically connected to the second node point and a cathode electrically connected to the third phase of the three-phase load.

7. The power converter arrangement of claim 1, wherein the connecting line connects the first node point of the first converter to a first node point of the second converter.

8. The power converter arrangement of claim 1, wherein at least one feed line to a load has at least one resistor.

9. The power converter arrangement of claim 1, wherein each feed line to a load has exactly one resistor for current measurement.

* * * * *